(12) United States Patent
Streeter et al.

(10) Patent No.: US 11,255,614 B2
(45) Date of Patent: Feb. 22, 2022

(54) HEAT EXCHANGER WITH BARRIER PASSAGES

(71) Applicant: Hamilton Sundstrand Corporation, Charolotte, NC (US)

(72) Inventors: James Streeter, Torrington, CT (US); Michael Zager, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 182 days.

(21) Appl. No.: 16/525,560

(22) Filed: Jul. 29, 2019

(65) Prior Publication Data

US 2021/0033354 A1    Feb. 4, 2021

(51) Int. Cl.
*F28F 3/14* (2006.01)
*F28D 9/00* (2006.01)
(Continued)

(52) U.S. Cl.
CPC ............... *F28F 3/14* (2013.01); *F28D 9/005* (2013.01); *F28D 9/0037* (2013.01); *F28F 1/003* (2013.01);
(Continued)

(58) Field of Classification Search
CPC .... F28F 1/022; F28F 1/025; F28F 3/12; F28F 3/14; F28F 3/086; F28F 2265/16;
(Continued)

(56) References Cited

U.S. PATENT DOCUMENTS 2,804,284 A  *  8/1957  Otten .................. F28F 1/22
                                                165/166
3,590,914 A      7/1971  Duncan
(Continued)

FOREIGN PATENT DOCUMENTS

DE       3215601 A1      10/1983
DE       9308202 U1  *   7/1993  ............... F16L 9/18
(Continued)

OTHER PUBLICATIONS

Extended European Search Report for EP Application No. 19213275.1, dated Jun. 22, 2020, 7 pages.
(Continued)

*Primary Examiner* — Len Tran
*Assistant Examiner* — Jenna M Hopkins
(74) *Attorney, Agent, or Firm* — Kinney & Lange, P.A.

(57) ABSTRACT

A heat exchanger core consists of first and second fluid channels, each configured to direct flow of respective fluids through the heat exchanger core. Each first fluid channel includes first fluid flow assemblies having inner channels formed by inner channel walls that contain the first fluid, each inner channel surrounded by a barrier channel having a barrier channel wall that isolates the barrier channel from the second fluid. One or more barrier channel vanes support the inner channel within the barrier channel. Each barrier channel provides a void space between the inner channel wall and the barrier channel wall, thereby fluidly separating the first fluid from the second fluid. Each barrier channel can receive the first or second fluid in the event of a breach of the inner channel wall or the barrier channel wall, thereby preventing intra-fluid contamination.

20 Claims, 7 Drawing Sheets

(51) Int. Cl.
*F28D 1/02* (2006.01)
*F28F 1/00* (2006.01)
*F28F 1/02* (2006.01)

(52) U.S. Cl.
CPC .............. *F28F 1/022* (2013.01); *F28F 1/025* (2013.01); *F28D 2001/026* (2013.01); *F28F 2265/16* (2013.01); *F28F 2265/22* (2013.01)

(58) Field of Classification Search
CPC ........ F28F 2265/22; F28F 1/003; F28F 7/103; F28F 7/106; F28F 13/18; F28D 2001/028; F28D 2001/0266; F28D 2001/026; F28D 1/0246; F28D 9/0037; F28D 9/005; F28D 7/10; F28D 1/0308; F28D 1/022; F28D 9/04; F28D 9/0081; F28D 9/0025; F28D 9/0012; F28D 9/0031
USPC .......................................................... 165/70
See application file for complete search history.

(56) References Cited

U.S. PATENT DOCUMENTS

| | | | |
|---|---|---|---|
| 4,275,784 A | 6/1981 | Popplewell et al. | |
| 4,694,864 A * | 9/1987 | Libin | B21C 37/154 |
| | | | 138/113 |
| 10,682,823 B2 * | 6/2020 | Hammer | B29C 73/22 |
| 2005/0051310 A1 * | 3/2005 | Inoue | F28F 1/06 |
| | | | 165/154 |
| 2016/0369698 A1 | 12/2016 | Army, Jr. et al. | |
| 2018/0345425 A1 | 12/2018 | Caimano et al. | |
| 2019/0024988 A1 | 1/2019 | Wilson et al. | |
| 2019/0024989 A1 | 1/2019 | Wilson et al. | |
| 2020/0309459 A1 * | 10/2020 | Streeter | B22F 10/20 |
| 2021/0071959 A1 * | 3/2021 | Streeter | F28F 7/02 |

FOREIGN PATENT DOCUMENTS

| | | | | |
|---|---|---|---|---|
| DE | 19608049 A1 | | 9/1997 | |
| EP | 2735832 A1 | | 5/2014 | |
| JP | 56016090 A | * | 2/1981 | ............. F28F 13/06 |
| JP | 61197995 A | * | 9/1986 | ............. F28F 1/003 |
| JP | 2008107013 A | * | 5/2008 | ............. F28F 1/003 |

OTHER PUBLICATIONS

Definition of Diffuser Stall Regimes, Applied Fluid Dynamics Handbook, 1 page, Table 7-6.

* cited by examiner

HEAT EXCHANGER WITH BARRIER PASSAGES

BACKGROUND

The present disclosure relates to heat exchangers, and more particularly, to a heat exchanger design that improves the fluid isolation between the hot and cold fluids.

Heat exchangers are known in the aviation arts and in other industries for providing a compact, low-weight, and highly-effective means of exchanging heat from a hot fluid to a cold fluid. Heat exchangers that operate at elevated temperatures often have short service lives and/or require increased maintenance as a result of high cyclic thermal stress. The stress is caused by multiple system and component factors including rapid flow and/or temperature transients, physical shock, and so on. Stress loading can cause failure of the fluid boundary separating the hot and the cold fluids, thereby resulting in inter-stream contamination of one working fluid by the other. Inter-stream contamination can be disadvantageous, particularly if one of the working fluids is toxic or flammable.

Heat exchanger designs that attempt to reduce the incidence of inter-stream contamination are known in the art, with examples being double closure bars and "inactive" fin or gap layers in plate-fin heat exchangers, and double tube sheets in shell-tube heat exchangers. However, there is a need for a robust heat exchanger design that can reduce inter-stream contamination in the event of the failure of a heat exchanger core component.

SUMMARY

A heat exchanger is configured to transfer heat between a first fluid and a second fluid, the first fluid being fluidly isolated from the second fluid. The heat exchanger includes a number of first fluid flow assemblies, each configured to direct flow of the first fluid through the heat exchanger core, each of the first fluid flow assemblies having an inner channel formed by an associated inner channel wall and configured to contain the first fluid, and a barrier channel surrounding the associated inner channel. The heat exchanger also includes one or more second fluid channels, each configured to channel flow of the second fluid through the heat exchanger core. Each barrier channel includes a barrier channel wall that isolates the barrier channel from the second fluid, and one or more barrier channel vanes that support the inner channel within the barrier channel. Each barrier channel provides a void space between the inner channel wall and the barrier channel wall, thereby fluidly separating the first fluid from the second fluid. Each barrier channel is configured to receive the first fluid in the event of a breach of the inner channel wall, and receive the second fluid in the event of a breach of the barrier channel wall.

DETAILED DESCRIPTION

The present disclosure is directed at a heat exchanger that can be used for exchanging heat between working fluids while maintaining a fluid separation between the two. Because a heat exchanger transfers heat from one fluid to another, heat will generally flow from the hot fluid to the cold fluid across the various components in the heat exchanger. Therefore, as used in this disclosure, "hot" will be used to describe the first fluid circuit and "cold" will be used to describe the second fluid circuit. The hot and cold fluids can also be referred to as working fluids. The terms "hot" and "cold" are relative one to the other. As used in different embodiments, the heat exchanger can encounter temperatures ranging from near absolute zero (for example, in cryogenic distillation) to 1,000 deg. F. (538 deg. C.) or more (for example, in gas turbine engine systems and related components). Moreover, "hot" and "cold" are used in this disclosure as descriptive terms to refer to the various components that are associated with the respective first and second fluid circuits in the heat exchanger core, without implying that particular temperatures or a temperature relationship exists for those components during the manufacturing process of the heat exchanger core. The hot fluid can be referred to as a first fluid, and the cold fluid can be referred to as a second fluid. For the sake of illustrating and describing the present disclosure, the exemplary embodiment shows a cross-counter flow heat exchanger.

Figure 1A:
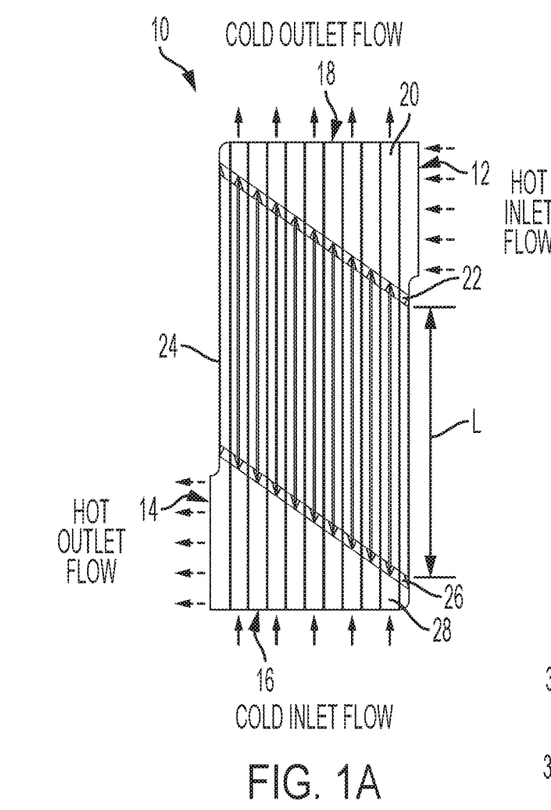
FIG. 1A is a top view of a heat exchanger with barrier passages.
Figure 1B:
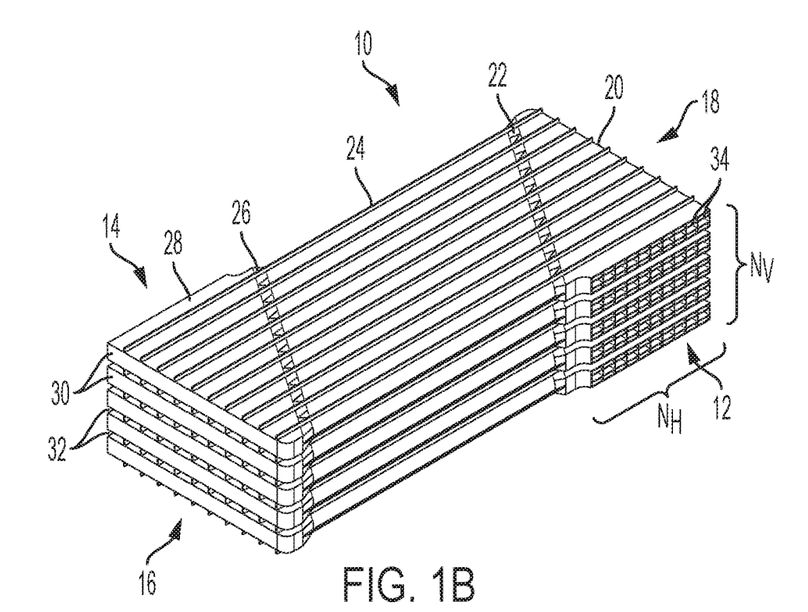
FIG. 1B is a perspective view of the heat exchanger shown in FIG. 1A.
Figure 1C:
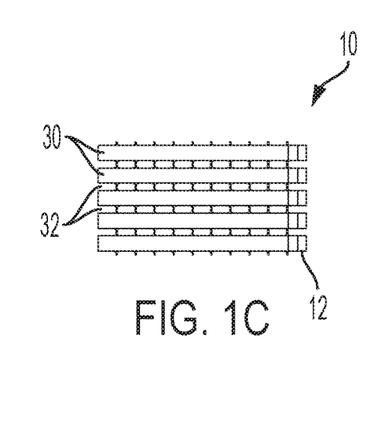
FIG. 1C is a front view of the heat exchanger shown in FIG. 1A.
Figure 1D:
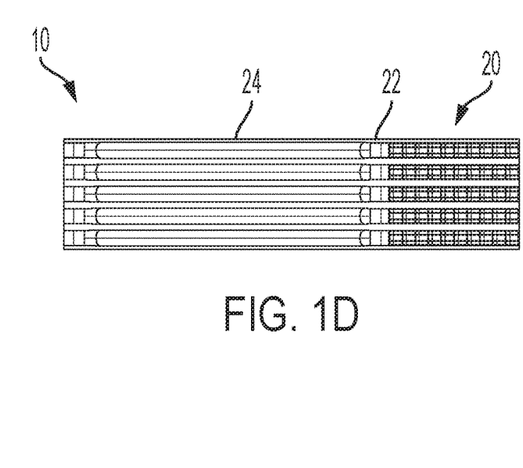
FIG. 1D is a side view of the heat exchanger shown in FIG. 1A.

FIG. 1A is a top view of a heat exchanger with barrier passages. FIG. 1B is a perspective view of the heat exchanger shown in FIG. 1A. FIG. 1C is a front view of the heat exchanger shown in FIG. 1A. FIG. 1D is a side view of the heat exchanger shown in FIG. 1A. Shown in FIGS. 1A-1D are heat exchanger 10, hot inlet 12, hot outlet 14, cold inlet 16, cold outlet 18, inlet plenum 20, inlet transition region 22, core 24, outlet transition region 26, outlet plenum 28, hot layer 30, cold layer 32, and hot inlet port 34. Core length L is labeled in FIG. 1A, and the numbers of vertical layers $N_V$ and horizontal channels $N_H$ are labeled in FIG. 1B. The hot inlet flow (i.e., first fluid) enters heat exchanger 10 at hot inlet 12, and the hot outlet flow exits heat exchanger 10 at hot outlet 14. The cold inlet flow (i.e., second fluid) enters heat exchanger 10 at cold inlet 16, and the cold outlet flow exits heat exchanger 10 at cold outlet 18. In the illustrated embodiment, the hot fluid enters hot inlet 12 and exits hot outlet 14 at a direction that is about perpendicular to the direction of the cold fluid flowing from cold inlet 16 to cold outlet 18 though heat exchanger 10. Hot fluid flows through inlet plenum 20 which changes the hot flow direction about 90 degrees. Accordingly, the hot fluid flows counter-parallel to the cold fluid through core 24. Inlet plenum 20 can also be referred to as an inlet manifold. After flowing through inlet plenum 20, the hot fluid flows through inlet transition region 22, core 24, outlet transition region 26, and through outlet plenum 28 (i.e., outlet manifold). In the illustrated embodiment, outlet plenum 28 changes the flow direction of the hot fluid about 90 degrees before exiting at hot outlet 14. Inlet and outlet plenums 20, 28 and inlet and outlet transition regions 22, 26 will be shown in more detail later, in FIGS. 5B-5C.

Heat transfer between the hot and cold fluid occurs throughout heat exchanger 10, including inlet plenum 20, inlet transition region 22, core 24, outlet transition region 26, outlet plenum 28. Core length L characterizes the length of core 24, where the majority of heat transfer occurs in heat exchanger 10. An appreciable amount of heat transfer can also occur across inlet and outlet plenums 20, 28, and some heat transfer can also occur across outlet transition regions 22, 26. The relative sizes of core 24, inlet and outlet plenums 20, 28, and inlet and outlet transition regions 22, 26 can affect the amount of heat transfer that occurs in these corresponding areas in heat exchanger 10. Heat exchanger 10 includes alternating hot layers 30 and cold layers 32, with any two vertically-adjacent hot layers 30 defining a cold layer 32 therebetween. The number of vertical layers $N_V$ refers to the number of hot layers 30 in heat exchange 10. In the illustrated embodiment, there are five hot layers 30, thereby defining four cold layers 32 therebetween, each of cold layers 32 providing a parallel flow path for cold fluid through heat exchanger 10. Heat exchanger 10 shown in FIGS. 1A-1D can be referred to as a "hot exterior" heat exchanger, because cold fluid does not flow exterior to the outermost (i.e., top and bottom) hot layers 30. In some embodiments, cold fluid can flow exterior to the outermost hot layers 30. In any particular embodiment, the number of hot layers 30 will generally be similar to the number of cold layers 32, perhaps differing by zero or one in most embodiments. In some embodiments, heat exchanger 10 can have only one or two hot layers 30 and an associated number of cold layers 32. In other embodiments, twelve or more hot layers 30 and an associated number of cold layers 32 can be used. In yet other embodiments, 25 or more hot layers 30 and an associated number of cold layers 32 can be used. Any numbers of hot and cold layers 30, 32 are within the scope of the present disclosure. Referring to FIG. 1B, the number of horizontal channels $N_H$ refers to the number of hot inlet ports 34 in each hot layer 30 in inlet plenum 20. In the illustrated embodiment, there are ten hot inlet ports 34 in each hot layer 30. As will be shown later in FIG. 2B, this corresponds to the number of hot flow assemblies in core 10 (not shown in FIGS. 1A-1D). In the illustrated embodiment, hot inlet 12 and hot outlet 14 each generally have a rectangular envelope, thereby providing the same number (i.e., ten) of hot inlet ports 34 in each hot layer 30 in inlet plenum 20. Accordingly, heat exchanger 10 can be described as having a rectangular cuboid geometrical shape. In some embodiments, hot inlet 12 and/or hot outlet 14 can have a non-rectangular geometrical configuration, with non-limiting examples being triangular and trapezoidal. In these other embodiments, the number of horizontal channels $N_H$ can be different across various hot layers 30. The hot fluid can be referred to as a first fluid, and the cold fluid can be referred to as a second fluid. Accordingly, hot inlet 12 can be referred to as the first fluid inlet, hot outlet 14 can be referred to as the first fluid outlet, cold inlet 16 can be referred to as the second fluid inlet, cold outlet 18 can be referred to as the second fluid outlet, hot layers 30 can be referred to as the first fluid layers, cold layers 32 can be referred to as the second fluid layers, and hot inlet port 34 can be referred to as the first fluid inlet port. Hot and/or cold layers 30, 32 can be referred to as hot and/or cold channels, respectively.

Referring again to FIG. 1A, heat exchanger core 24 as viewed from the top has an outer geometric shape similar to a parallelogram. Accordingly, core length L can be said to be equivalent to the base of the parallelogram. In the illustrated embodiment, core length L is about 6 inches (15 cm). In some embodiments, core length L can range from about 2-24 inches (5-61 cm). In other embodiments, core length L can be less than 2 inches (5 cm) or more than 24 inches (61 cm). It is to be appreciated that in some embodiments of heat exchanger core 24, core length L can scale with the height and width (not labeled) of heat exchanger core 24. In a particular embodiment of heat exchanger core 24, core length L can be zero or nearly zero. Therefore, in that particular embodiment, all or nearly all of the heat transfer will take place across inlet and outlet plenums 20, 28, and some heat transfer can also occur across outlet transition regions 22, 26.

Heat exchanger 10 (including core 24, inlet and outlet plenums 20, 28, and inlet and outlet transition regions 22, 26) can be formed by an additive manufacturing process. In an exemplary embodiment, powder bed fusion can be used as an additive manufacturing process to fabricate heat exchanger 10 from metallic materials. Non-limiting examples of metallic materials that can be used include nickel, aluminum, titanium, copper, iron, cobalt, and all alloys that include these various metals. In some embodiments, various alloys of INCONEL™ can be used to fabricate heat exchanger 10, with Inconel 625 and Inconel 718 being two exemplary alloy formulations. In other embodiments, HAYNES™ 282 can be used in fabricating heat exchanger 10. In yet other embodiments, alloys of aluminum can be used in fabricating heat exchanger 10. For example, an alloy of aluminum known as A205 can be used in fabricating heat exchanger 10. All materials that include metals, metal oxides, and alloys thereof in fabricating heat exchanger 10 are within the scope of the present disclosure.

Figure 2A:
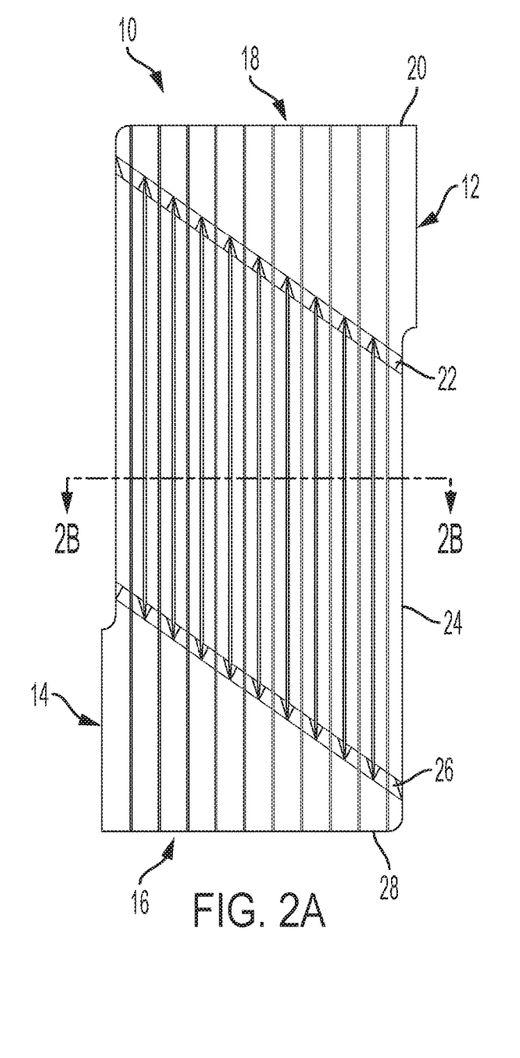
FIG. 2A is the top view of the heat exchanger shown in FIG. 1A showing cross-sectional cut line 2B-2B.
Figure 2B:
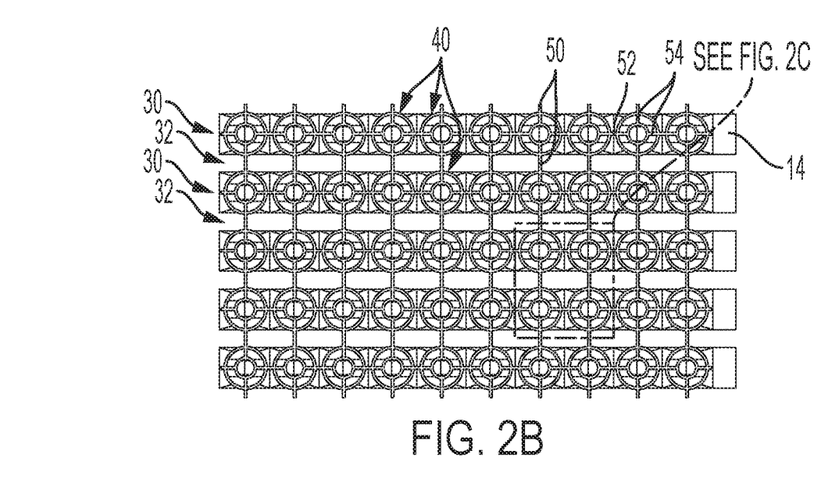
FIG. 2B is a cross-sectional front view showing the core area of the heat exchanger shown in FIG. 2A taken at cut line 2B-2B.
Figure 2C:
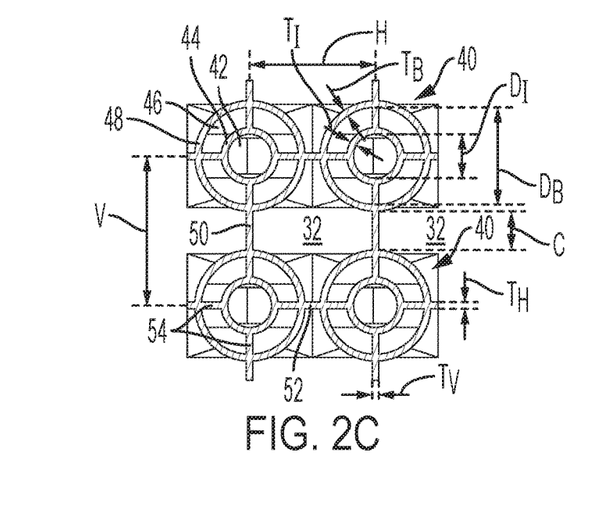
FIG. 2C is an enlarged cross-sectional front view showing four hot flow assemblies shown in FIG. 2A.

FIG. 2A is the top view of heat exchanger 10 shown and described above in FIG. 1A, showing cross-sectional cut line 2B-2B. FIG. 2B is a cross-sectional front view showing the core area of heat exchanger 10 shown in FIG. 2A taken at cut line 2B-2B. FIG. 2C is an enlarged cross-sectional front view showing four hot flow assemblies shown in FIG. 2A. Shown in FIGS. 2B-2C are hot layers 30, cold layers 32, hot flow assemblies 40, inner channels 42, inner channel walls 44, barrier channels 46, barrier channel walls 48, vertical vanes 50, horizontal vanes 52, and barrier channel vanes 54. Also labeled in FIG. 2C are horizontal spacing H, vertical spacing V, cold channel height C, horizontal vane thickness $T_H$, vertical vane thickness $T_V$, inner channel diameter $D_I$, inner channel wall thickness $T_I$, barrier channel diameter $D_B$, and barrier channel wall thickness $T_B$. The cross-sectional view of core 24 shown in FIG. 2B depicts five hot layers 30 (i.e., the number of vertical layers $N_V$), each having ten hot flow assemblies 40 (i.e., the number of horizontal layers $N_H$). A cold layer 32 is sandwiched between any two adjacent hot layers 30. In the illustrated embodiment, each hot flow assembly 40 corresponds to an associated hot inlet port 34. In some embodiments, two or more hot flow assemblies 40 can correspond to an associated hot inlet port 34. In other embodiments, one hot flow assembly 40 can correspond to two or more an associated hot inlet ports 34.

Referring again to FIGS. 2B-2C, each hot layer 30 within core 24 includes a number of hot flow assemblies 40. Vertically-adjacent hot flow assemblies 40 from one hot layer 30 to the next are supported vertically by vertical vanes 50, and horizontally-adjacent hot flow assemblies 40 within any particular hot layer 30 are supported horizontally by horizontal vanes 52. Each hot flow assembly 40 includes inner channel 42 located coaxially interior to an associated barrier channel 46, supported by barrier channel vanes 54. Each inner channel 42 is defined by an associated inner channel wall 44, and each barrier channel 46 is defined by an associated inner channel wall 44 and barrier channel wall 48. The hot (i.e., first) fluid flows in parallel through the various inner channels 42, the flow through each inner channel 42 being directed by an associated hot inlet port 34. Accordingly, inner channel walls 44 provide a pressure boundary for the hot fluid. The cold (i.e., second) fluid flows through respective cold layers 32, with barrier channel walls 48 providing a pressure boundary for the cold fluid. Hot flow assemblies 40 can be referred to as the first fluid flow assemblies.

In the illustrated embodiment, horizontal spacing H is about 0.2 inch (5 mm), vertical spacing V is about 0.18 inch (4.6 mm), cold channel height C is about 0.7 inch (18 mm), inner channel diameter $D_I$ is about 0.125 inch (3.2 mm), and barrier channel diameter $D_B$ is about 0.4 inch (10 mm). The interior (i.e., radial) dimension of barrier channel 46 (not labeled) can be calculated, if desired, from these dimensions. In some embodiments, horizontal spacing H can range from about 0.1-1 inch (2.5-25 mm). In other embodiments, horizontal spacing H can be less than 0.1 inch (2.5 mm) or greater than 1 inch (25 mm). In some embodiments, vertical spacing V can range from about 0.1-1 inch (2.5-25 mm). In other embodiments, vertical spacing V can be less than 0.1 inch (2.5 mm) or greater than 1 inch (25 mm). In some embodiments, cold channel height C can range from about 0.05-0.5 inch (1.3-13 mm). In other embodiments, cold channel height C can be less than 0.05 inch (1.3 mm) or greater than 0.5 inch (13 mm). In some embodiments, inner channel diameter $D_I$ can range from about 0.05-0.5 inch (1.3-13 mm). In other embodiments, inner channel diameter $D_I$ can be less than 0.05 inch (1.3 mm) or greater than 0.5 inch (13 mm). In some embodiments, barrier channel diameter $D_B$ can range from about 0.1-1 inch (2.5-25 mm). In other embodiments, barrier channel diameter $D_B$ can be less than 0.1 inch (2.5 mm) or greater than 1 inch (25 mm).

In the illustrated embodiment, horizontal vane thickness $T_H$, vertical vane thickness $T_V$, and barrier channel wall thickness $T_B$ are each about 0.012 inch (0.3 mm). Barrier channel vane thickness (not labeled) can be similar in dimension to horizontal and/or vertical vane thicknesses $T_H$, $T_V$. In some embodiments, horizontal vane thickness $T_H$, vertical vane thickness $T_V$, and/or barrier channel wall thickness $T_B$ can range from about 0.008-0.02 inch (0.2-0.5 mm). In other embodiments, horizontal vane thickness $T_H$, vertical vane thickness $T_V$, and/or barrier channel wall thickness $T_B$ can be less than 0.008 inch (0.2 mm) or greater than 0.02 inch (0.5 mm). In any embodiment, some or all of horizontal vane thickness $T_H$, vertical vane thickness $T_V$, barrier channel wall thickness $T_B$, and barrier vane thickness can be different from each other.

During normal operation of heat exchanger 10, each barrier channel 46 is devoid of working fluid (i.e., either hot or cold fluid). Accordingly, each barrier channel 46 can be referred to as a void, thereby forming a void space between respective inner channel wall 44 and barrier channel wall 48. In the illustrated embodiment, barrier channels 46 are vented to the ambient and are therefore filled with air. In some embodiments, barrier channels 46 can be filled with a fluid other than air. In some of these embodiments, a reason for replacing air with non-air fluids within barrier channels 46 can be to provide greater heat transfer across barrier channels 46 by using a fluid having a thermal conductivity that is greater than that of air, thereby improving the thermal efficiency of heat exchanger 10. In the event of a material failure within heat exchanger 10, a leaking working fluid (i.e., hot fluid and/or cold fluid) will flow into one or more barrier channels 46, thereby preventing the inter-stream contamination between the hot and cold fluids. This can be referred to as barrier protection. Barrier channels 46 can be described as providing leak prevention, with reference to helping prevent a leak between the hot and cold fluid circuits. In some embodiments, a tell-tale drain (not shown in FIGS. 2A-2C) can be provided to direct the leaking fluid to a collection point that is observable by an operator. In some embodiments, an apparatus can be provided to monitor for leakage into barrier channels 46 and this will be described in more detail later, in FIGS. 6B-6C.

Referring again to FIG. 2C, heat transfer occurs across each of the hot flow assemblies 40 from the hot fluid within inner channels 42, through inner channel walls 44, across barrier channels 46, and through barrier channel walls 48 into the cold fluid within cold layers 32. In some embodiments, a portion of the heat transfer occurring within each one hot flow assembly 40 will be by thermal conduction radially through barrier channel vanes 54 from inner channel wall 44 to barrier channel wall 48. In these embodiments, the relative proportion of heat transfer through barrier channel vanes 54 will depend on several factors, with non-limiting examples being the thermal conductivity of the particular material used, and the relative shape, size, and/or number of barrier channel vanes 54. Alternative embodiments of barrier channel vanes 54 will be described later, in FIG. 7C.

The foregoing description is based on the hot fluid having a higher temperature than the cold fluid, with the hot fluid being directed through inner channels. In some embodiments, the hot fluid (i.e., the fluid having a higher temperature) can be directed through cold layers 32, and the cold fluid (i.e., the fluid having a lower temperature) can be directed through inner channels 42. It is to be appreciated that cold layers 32 are so-named with regard to the physical structure of heat exchanger 10 as shown in the present disclosure, without regard to the actual temperature relationship of the fluids flowing therethrough. Several factors can be used in determining the flow configuration in a particular embodiment of heat exchanger 10. A non-limiting exemplary factor is the system pressures of the respective hot and cold fluids. In a particular embodiment, it can be beneficial to direct the fluid having a higher system pressure through inner channels 42, which have a smaller surface area than associated barrier channels 46, resulting in lower material strength requirements as compared to a situation where barrier channels 46 and associated vertical vanes 50 and horizontal vanes 52 were used to contain the pressure of the fluid having the higher pressure.

Figure 3A:
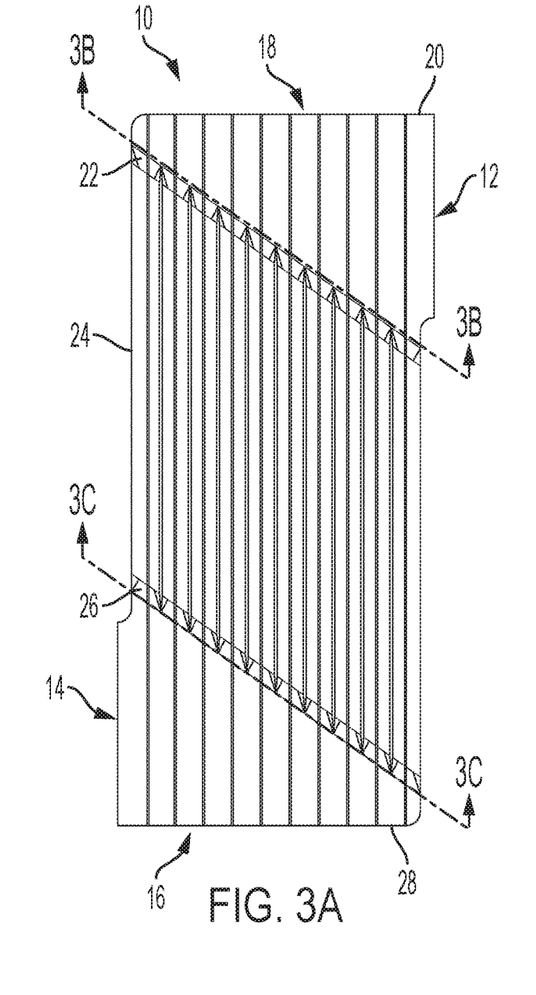
FIG. 3A is the top view of the heat exchanger shown in FIG. 1A showing cross-sectional cut lines 3B-3B and 3C-3C.
Figure 3B:
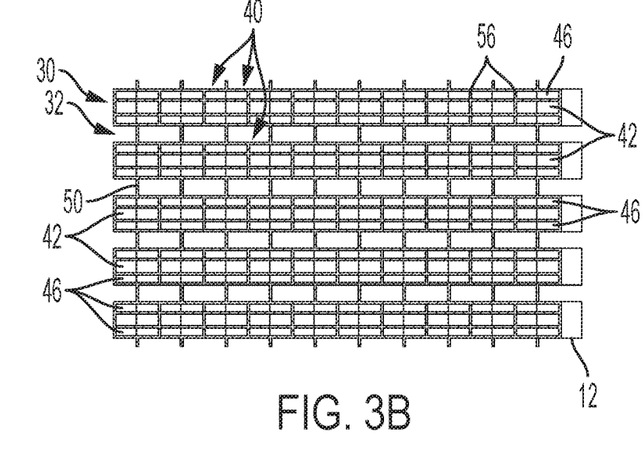
FIG. 3B is a cross-sectional front view showing a plenum area of the heat exchanger shown in FIG. 3A taken at cut line 3B-3B.
Figure 3C:
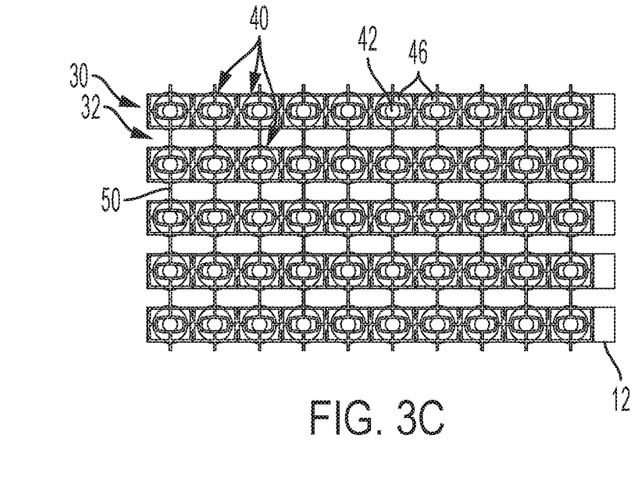
FIG. 3C is a cross-sectional front view showing a plenum transition area of the heat exchanger shown in FIG. 3A taken at cut line 3C-3C.

FIG. 3A is the top view of heat exchanger 10 shown in FIG. 1A showing cross-sectional cut lines 3B-3B and 3C-3C. FIG. 3B is a cross-sectional front view showing a plenum area of heat exchanger 10 shown in FIG. 3A taken at cut line 3B-3B. FIG. 3C is a cross-sectional front view showing a plenum transition area of heat exchanger 10 shown in FIG. 3A taken at cut line 3C-3C. Shown in FIGS. 3B-3C are hot layers 30, cold layers 32, hot flow assemblies 40, inner channels 42, barrier channels 46, and vertical vanes 50.

Referring first to FIG. 3B, alternating hot layers 30 are vertically-supported by vertical vanes 50, with each cold layer 32 being sandwiched between two vertically-adjacent hot layers 30. Hot flow assemblies 40 are shown in inlet plenum 20, just prior to inlet transition region 22, with each hot flow assembly 40 including inner channel 42 sandwiched vertically between two associated barrier channels 46. The configuration of inner channels 42 and barrier channels 46 is similar to that of each hot inlet port 34, shown above in regard to FIG. 1B. Accordingly, barrier protection is provided throughout inlet and outlet plenums 22, 28 by two associated barrier channels 46 vertically sandwiching a corresponding inner channel 42 therebetween.

Referring next to FIG. 3C, the shape of each inner channel 42 at the indicated position in outlet transition region 26 is generally round, having a round shape within core 24, as shown above in regard to FIG. 2C. The shape of each barrier channel transitions from round (from within core 24 as shown above in regard to FIG. 2C) to rectangular (from within inlet and outlet plenum 20, 28 as shown above in regard to FIG. 3B) within inlet transition region 22. Accordingly, inlet transition region changes the configuration of inner channels 42 and barrier channels 46 from a sandwiching configuration within inlet plenum 22 to a coaxial configuration within core 24. Similarly, an opposite transition of the shape of inner channels 42 and barrier channels occurs in outlet transition region 26.

Figure 4A:
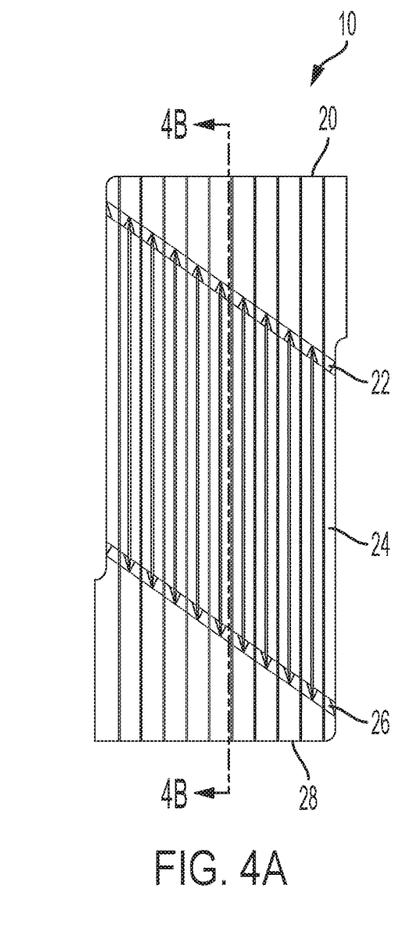
FIG. 4A is the top view of the heat exchanger shown in FIG. 1A showing cross-sectional cut line 4B-4B.
Figure 4B:
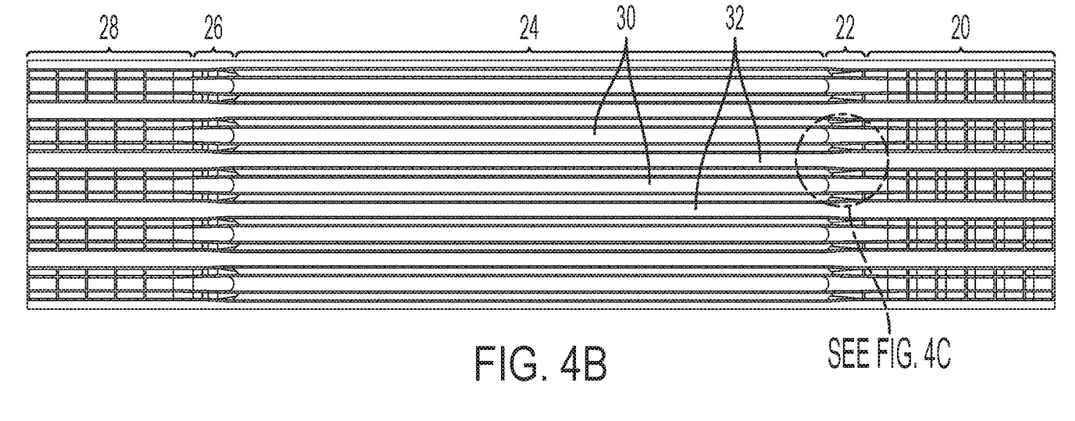
FIG. 4B is a cross-sectional side view showing the core and plenum areas of the heat exchanger shown in FIG. 4A taken at cut line 4B-4B.
Figure 4C:
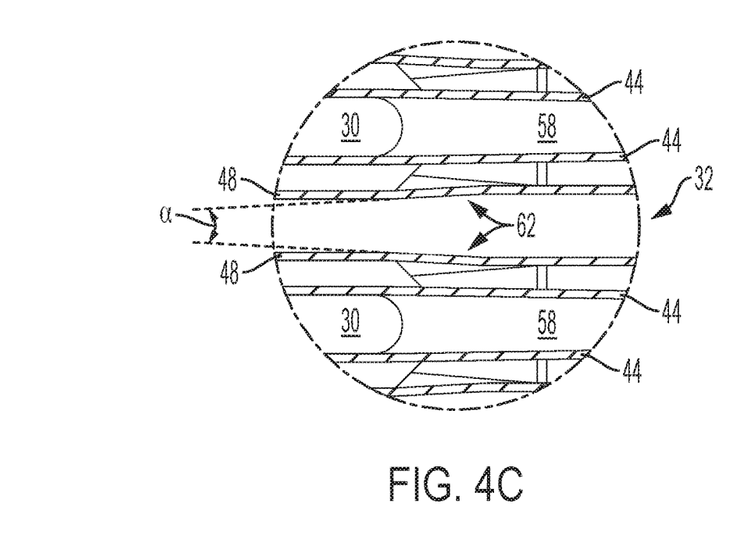
FIG. 4C is an enlarged cross-sectional side view showing the transition region shown in FIG. 4B.

FIG. 4A is the top view of heat exchanger 10 shown in FIG. 1A showing cross-sectional cut line 4B-4B. FIG. 4B is a cross-sectional side view showing the core and plenum areas of heat exchanger 10 shown in FIG. 4A taken at cut line 4B-4B. FIG. 4C is an enlarged cross-sectional side view showing the transition region shown in FIG. 4B. Shown in FIGS. 4B-4C are inlet plenum 20, inlet transition region 22, core 24, outlet transition region 26, outlet plenum 28, hot layers 30, cold layers 32, inner channel walls 44, barrier channel walls 48, plenum channels 58, and vertical transition 62. Also labeled in FIG. 4C is vertical transition angle $\alpha$. The relative sizes of inlet plenum 20, inlet transition region 22, core 24, outlet transition region 26, and outlet plenum 28 with respect to each other are shown in FIG. 4B. These relative sizes can change in various embodiments. Inlet and outlet transition regions 22, 26 symmetrical to each other, being of equivalent size. Inlet and outlet plenums 22, 28 are also symmetrical to each other, while being of equivalent size. In some embodiments, inlet and outlet transition regions 22, 26 and/or inlet and outlet plenums 22, 28 can be asymmetrical.

Referring again to FIG. 4C, barrier channel walls 48 have vertical transition angle $\alpha$ in inlet transition region 22 as barrier channel 46 (not labeled in FIG. 4C) transitions from inlet plenum 20 to core 24. In the illustrated embodiment, vertical transition angle $\alpha$ is about 14 degrees. In some embodiments, vertical transition angle $\alpha$ can range from about 4-40 degrees. In other embodiments, vertical transition angle $\alpha$ can be less than 4 degrees or greater than 40 degrees. In a preferred embodiment, vertical transition angle $\alpha$ can range from about 12-18 degrees. Several factors can determine the value of vertical transition angle $\alpha$ in a particular embodiment, with non-limiting examples being the number and/or relative sizes of inner channels 42 and barrier channels, and the relative size of inlet and outlet transition regions 22, 28 relative to inlet and outlet plenums 20, 28 and/or relative to core 24. Additionally, the particularly additive manufacturing method that is used to fabricate heat exchanger 10 can influence the selection of value used for vertical transition angle $\alpha$. It is to be appreciated that vertical transition angle $\alpha$ measures an included (i.e., full) angle.

Figure 5A:
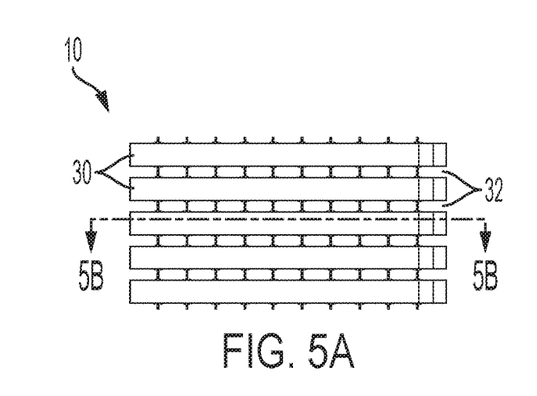
FIG. 5A is the front view of the heat exchanger shown in FIG. 1C showing cross-sectional cut line 5B-5B.
Figure 5B:
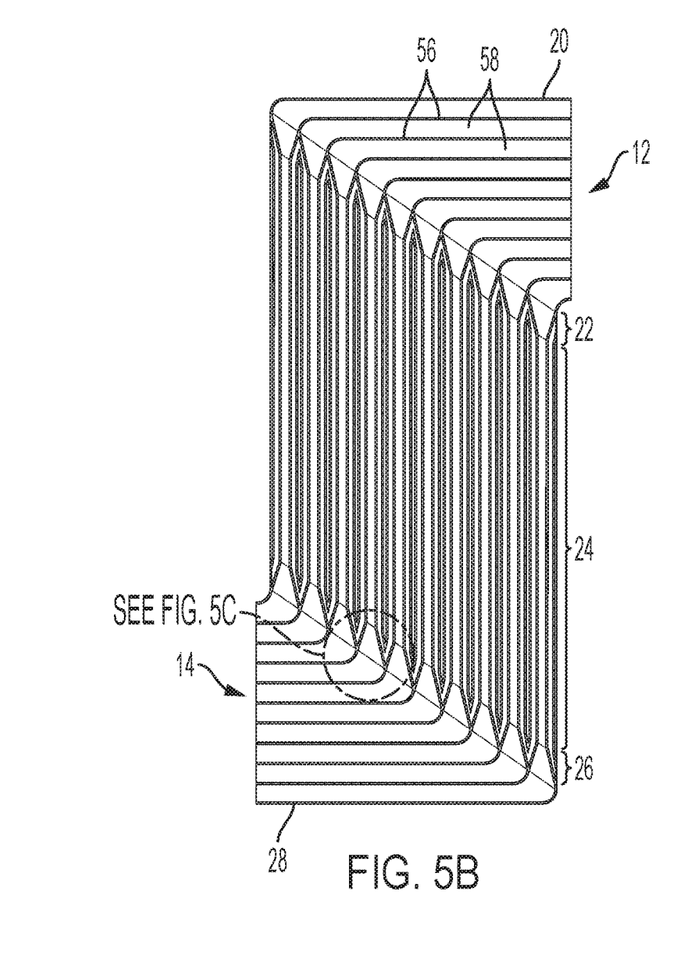
FIG. 5B is a cross-sectional top view showing the core and plenum areas of the heat exchanger shown in FIG. 5A taken at cut line 5B-5B.
Figure 5C:
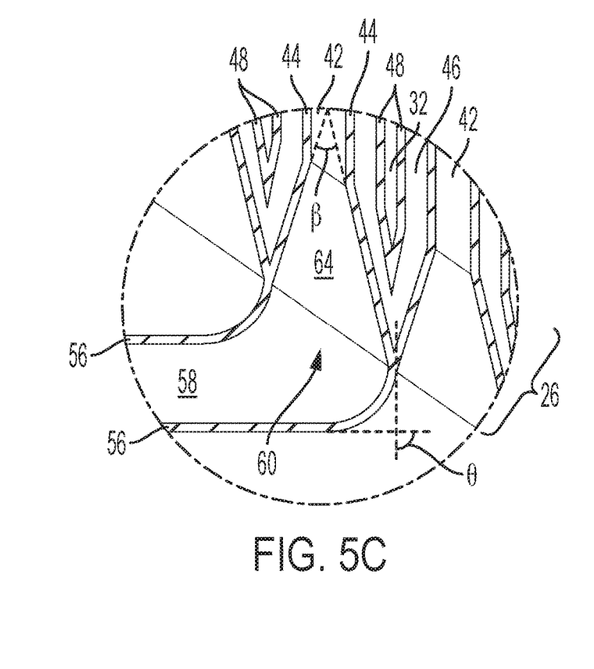
FIG. 5C is an enlarged cross-sectional top view showing the transition region shown in FIG. 5B.

FIG. 5A is the front view of heat exchanger 10 shown in FIG. 1C showing cross-sectional cut line 5B-5B. FIG. 5B is a cross-sectional top view showing the core and plenum areas of heat exchanger 10 shown in FIG. 5A taken at cut line 5B-5B. FIG. 5C is an enlarged cross-sectional top view showing the transition region shown in FIG. 5B. Shown in FIGS. 5B-5C are inlet plenum 20, inlet transition region 22, core 24, outlet transition region 26, outlet plenum 28, hot layers 30, cold layers 32, inner channels 42, inner channel walls 44, barrier channels 46, barrier channel walls 48, plenum vanes 56, plenum channels 58, flow transition region 60, and horizontal transition 64. Also labeled in FIG. 5C are flow transition angle $\Theta$ and barrier channel transition angle $\beta$. Within inlet and outlet plenums 20 and 28, multiple plenum vanes 56 form associated plenum channels 58 therebetween. Hot fluid changes flow direction as it passes through respective inlet and outlet plenums 20, 28, being directed by plenum vanes 56 within flow transition region 60. Flow transition angle $\Theta$ describes the angular change in hot flow direction within inlet and outlet plenums 20, 28. In the illustrated embodiment, flow transition angle $\Theta$ is about 90 degrees, thereby providing for the right-angle cross-counter flow heat exchanger shown in the illustrated embodiment. In other embodiments, inlet and/or outlet plenums 20 and 28 can change the direction of hot fluid flow by any flow transition angle $\Theta$ that ranges from about 0-120 degrees. As noted above in regard to FIG. 4A, heat exchanger 10 can be asymmetrical in some embodiments. Accordingly, in some embodiments, inlet and outlet plenums 20 and 28 can each change the direction of hot fluid flowing therethrough by different angles from each other, with each having a different flow transition angle $\Theta$ that ranges from about 0-120 degrees.

Referring again to FIGS. 5B-5C, horizontal transition 64 abuts each respective plenum vane 56 in inlet and outlet transition region 22, 26, thereby creating a transition for hot flow from each plenum channel 58 into an associated inner channel 42 within each hot channel 30. Horizontal transition 64 also forms two associated inner channel 44 and two associated barrier channel walls 48, thereby forming an associated barrier channel 46 while channeling cold flow through respective cold layers 32. In the illustrated embodiment, barrier channel transition angle β is about 20 degrees. In some embodiments, barrier channel transition angle β can range from about 2-45 degrees. In other embodiments, barrier channel transition angle β can be less than 2 degrees or greater than 45 degrees. In a preferred embodiment, barrier channel transition angle β can range from about 12-18 degrees. Several factors can determine the value of vertical transition angle α in a particular embodiment, with non-limiting examples being the number and/or relative sizes of inner channels 42 and barrier channels, and the relative size of inlet and outlet transition regions 22, 28 relative to inlet and outlet plenums 20, 28 and/or relative to core 24. Additionally, the particularly additive manufacturing method that is used to fabricate heat exchanger 10 can influence the selection of value used for barrier channel transition angle β. It is to be appreciated that barrier channel transition angle β measures an included (i.e., full) angle.

Figure 6A:
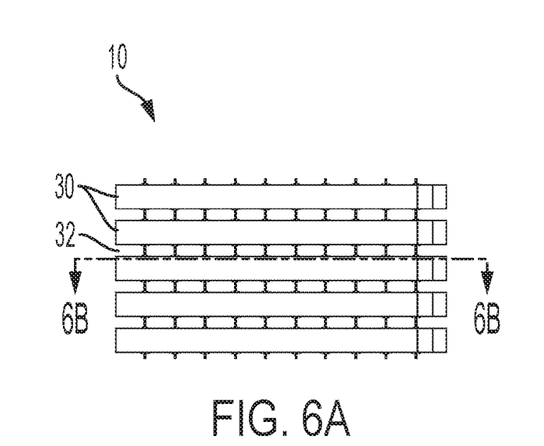
FIG. 6A is the front view of the heat exchanger shown in FIG. 1C showing cross-sectional cut line 6B-6B.
Figure 6B:
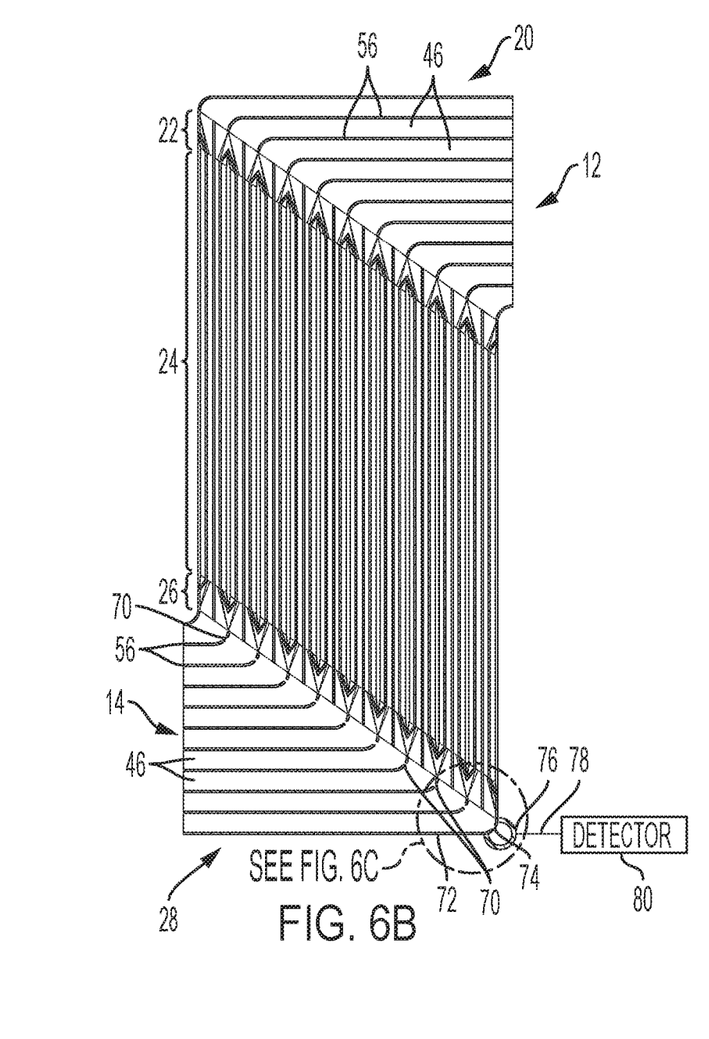
FIG. 6B is a cross-sectional top view showing the core and plenum areas, leakage passages, and a schematic diagram of a leakage detector of the heat exchanger shown in FIG. 6A taken at cut line 6B-6B.
Figure 6C:
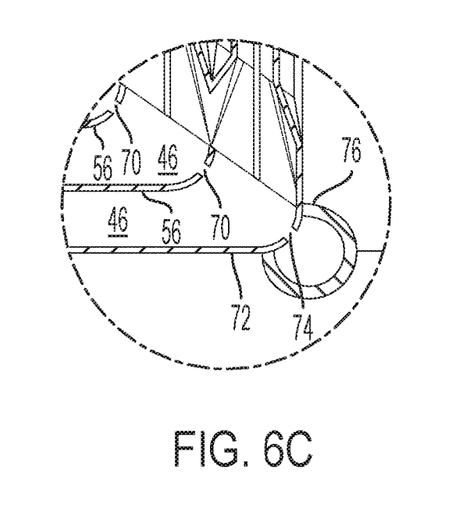
FIG. 6C is an enlarged cross-sectional top view showing the leakage passages shown in FIG. 6B.

FIG. 6A is the front view of heat exchanger 10 shown in FIG. 1C showing cross-sectional cut line 6B-6B. FIG. 6B is a cross-sectional top view showing the core and plenum areas, leakage passages, and a schematic diagram of a leakage detector of heat exchanger 10 shown in FIG. 6A taken at cut line 6B-6B. FIG. 6C is an enlarged cross-sectional top view showing the leakage passages and telltale drain shown in FIG. 6B. Note that cut line 6B-6B is taken closer to the top of hot layer 30 as compared to cut line 5B-5B shown above in regard to FIGS. 5A-5C, along a plane that passes through barrier channels 46 in inlet and outlet plenums 20, 22, while also showing a different perspective of inlet and outlet transition regions 22, 26, and of core 24. Shown in FIGS. 6A-6C are heat exchanger 10, hot inlet 12, hot outlet 14, inlet plenum 20, inlet transition region 22, core 24, outlet transition region 26, outlet plenum 28, hot layer 30, cold layer 32, barrier channels 46, plenum vanes 56, leakage passages 70, outer wall 72, tell-tale drain 74, leakage catchment 76, leakage detector line 78, and leakage detector 80. The descriptions of hot inlet and outlet 12, 14, inlet and outlet plenums 20, 28, inlet and outlet transition regions 22, 26, core 24, hot and cold layers 30, 32, barrier channels 46, and plenum vanes 56 are substantially similar to those provided above in regard to FIGS. 5A-5C. In the illustrated embodiment, a leakage passage 70 is provided through each plenum vane 56 in barrier channel 46 within outlet plenum 28, thereby fluidly connecting all barrier channels 46 together. Leakage passages 70 can also be referred to as apertures or bleed holes. Tell-tale drain 74 penetrates outer wall 72, thereby providing a discharge path from heat exchanger 10 for any fluid that accumulates in barrier channels 46. As described above in regard to FIGS. 2A-2C, barrier channels 46 are normally devoid of fluid (i.e., hot and/or cold fluids), but a breach of either the hot or cold fluid boundary will result in the leakage of the respective fluid into one or more barrier channels 46, thereby preventing inter-stream contamination between the hot and cold fluid circuits. Leakage passages 70 and tell-tale drain 74 can also be referred to as leak-off protection. In the illustrated embodiment, leakage passages 70 and tell-tale 74 are located in outlet plenum 28. In some embodiments, leakage passages 70 and tell-tale 74 can be located in inlet plenum 20, or in both inlet and outlet plenums 20, 28. In an exemplary embodiment, leakage passages 70 and tell-tale 74 (i.e., leak-off protection) can be located at or near a gravity low-point (not labeled) of heat exchanger 10, thereby providing for the gravity removal of fluid in one or more barrier channels 46 from heat exchanger 10.

Referring again to FIGS. 6B-6C, leakage catchment 76 provides a collection point for fluid that flows through tell-tale drain 74 from heat exchanger 10. In the illustrated embodiment, leakage detector line 78 fluidly connects leakage catchment 76 to leakage detector 80, and leakage detector 80 can be configured to provide an indication of the presence of fluid, thereby providing an indication of a failure of a hot and/or cold pressure boundary within heat exchanger 10. In an exemplary embodiment, leakage detector 80 can provide a signal (e.g., alarm, alert notification) indicating the detection of a fluid. In a particular embodiment, leakage detector 80 can be a pressure detector. In another particular embodiment, leakage detector 80 can be a liquid detector that provides an electrical signal that indicates the presence of a liquid. Liquid detectors are known in the art, with exemplary methods of liquid detection including electrical conductivity, electrical capacitance, thermal conductivity, optical conductivity, and fluid density. In some embodiments, leakage catchment 76, leakage detector line 78, and/or leakage detector 80 can be omitted from heat exchanger 10. In an exemplary embodiment, tell-tale drain 74 can provide a fluid path from heat exchanger 10 directly to the ambient region surrounding heat exchanger 10. In this exemplary embodiment, an operator could directly observe fluid flowing (e.g., weeping, dripping, squirting) from tell-tale drain 74. Note that leakage catchment 76, leakage detector line 78, and leakage detector 80 are not shown in FIG. 6A.

The embodiment of heat exchanger 10 shown and described in the above figures depicted inner channels 42 and barrier channels 46 having circular cross-sectional geometries. In various embodiments, inner and barrier channels 42, 46 having circular cross-sectional geometries can be beneficial for design simplicity, for containing relatively high system pressures, and so on. Other geometric configurations for inner and/or barrier channels 42, 46 are also within the scope of the present disclosure. Moreover, other configurations for barrier channel vanes 54 are within the scope of the present disclosure, as will be described.

Figure 7A:
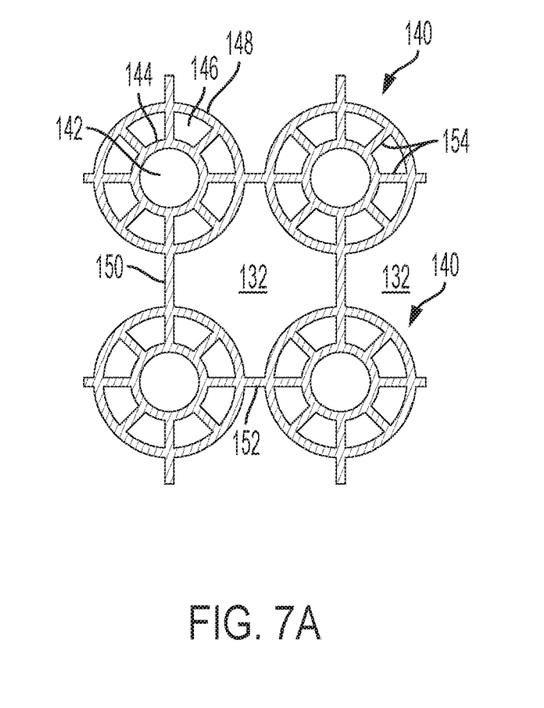
FIG. 7A is a cross-sectional front view showing a second embodiment of four hot flow assemblies.

FIG. 7A is a cross-sectional front view showing a second embodiment of four hot flow assemblies, a view that is similar to that shown above in regard to FIG. 2C. Shown in FIG. 7A are cold layer 132, hot flow assembly 140, inner channel 142, inner channel wall 144, barrier channel 146, barrier channel wall 148, vertical vanes 150, horizontal vanes 152, and barrier channel vanes 154, all of which have descriptions that are substantially similar to those provided above in regard to FIG. 2C, with the exception that each particular barrier channel 146 includes eight barrier channel vanes 154. In the illustrated embodiment, the eight barrier channel vanes 154 are spaced approximately equally around inner channel 142 (i.e., approximately 45 degrees apart from one another) in each barrier channel 146, connecting inner channel wall 144 to barrier channel wall 148. Moreover, in the illustrated embodiment, two of the barrier channel vanes 154 are aligned vertically (i.e., in line with vertical vanes 150), and two of the barrier channel vanes 154 are aligned horizontally (i.e., in line with horizontal vanes 152). In some embodiments, more than or fewer than eight barrier channel vanes 154 can be used in a particular barrier channel 146, each having radial orientations that are different from those shown in the illustrated embodiment. Several factors can be considered in the selection of the quantity and alignment of barrier channel vanes 154. Non-limiting exemplary factors are the need for greater structural support within heat exchanger 10, the containment of relatively high hot fluid and/or cold fluid system pressures, the providing greater thermal conductivity from inner channel wall 144 to barrier channel wall 148 via barrier channel vanes 154, and additive manufacturing process optimization. In other embodiments, different hot flow assemblies 140 can have different numbers of via barrier channel vanes 154 throughout respective barrier channels 146.

Figure 7B:
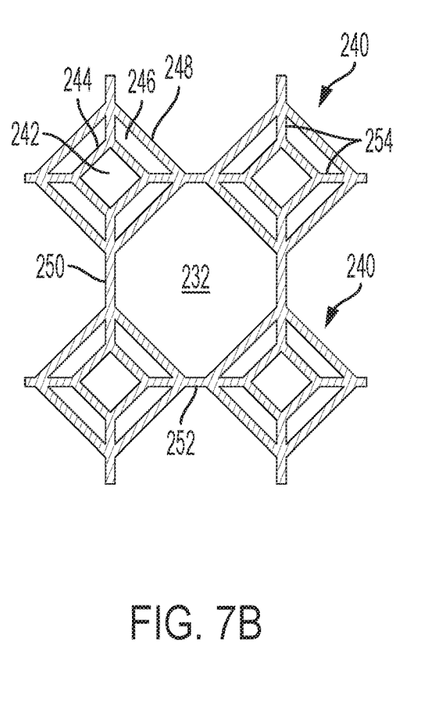
FIG. 7B is a cross-sectional front view showing a third embodiment of four hot flow assemblies.

FIG. 7B is a cross-sectional front view showing a third embodiment of four hot flow assemblies, a view that is similar to that shown above in regard to FIG. 2C. Shown in FIG. 7B are cold layer 232, hot flow assembly 240, inner channel 242, inner channel wall 244, barrier channel 246, barrier channel wall 248, vertical vanes 250, horizontal vanes 252, and barrier channel vanes 254, all of which have descriptions that are substantially similar to those provided above in regard to FIG. 2C, with the exception that inner channel wall 244 and barrier channel wall 248 have rhomboid (i.e., diamond, skewed square) cross-sectional geometries. The configuration shown in the illustrated embodiment can be advantageous over a circular cross-sectional geometry (i.e., as shown in FIG. 2C), with exemplary benefits being to provide greater structural strength and/or stability for heat exchanger 10, to control the stiffness of heat exchanger 10 along a particular axis, and to optimize additive manufacturing processes. The configuration shown for inner channel wall 244 and barrier channel wall 248 in the illustrated embodiment uses square rhomboids. In some embodiments, inner channel wall 244 and/or barrier channel wall 248 can use non-square rhomboids (e.g., kite-shape, parallelogram-shape, irregular shape). In other embodiments, inner channel wall 244 and barrier channel wall 248 geometries can be different from each other. For example, in a particular embodiment, inner channel wall 244 can have a circular geometry (e.g., for pressure containment), and barrier channel wall 248 can have a rhomboid geometry (e.g., for structural strength).

Figure 7C:
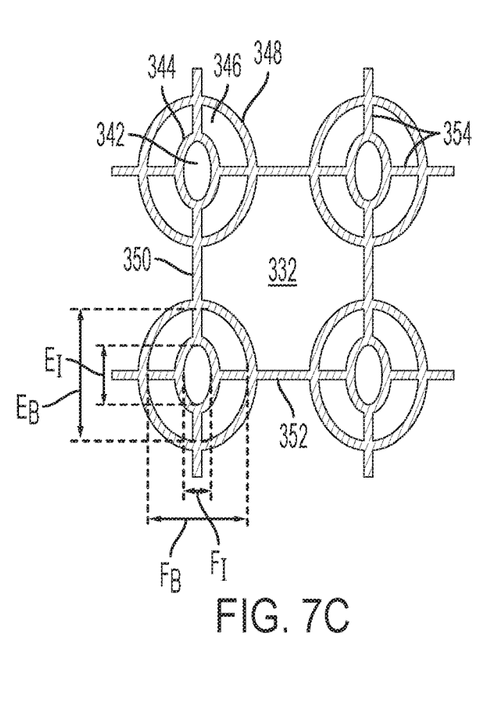
FIG. 7C is a cross-sectional front view showing a fourth embodiment of four hot flow assemblies.

FIG. 7C is a cross-sectional front view showing a fourth embodiment of four hot flow assemblies, a view that is similar to that shown above in regard to FIG. 2C. Shown in FIG. 7B are cold layer 332, hot flow assembly 340, inner channel 342, inner channel wall 344, barrier channel 346, barrier channel wall 348, vertical vanes 350, horizontal vanes 352, and barrier channel vanes 354, all of which have descriptions that are substantially similar to those provided above in regard to FIG. 2C, with the exception that inner channel 342 and barrier channel wall 348 have elliptical geometries. Also labeled in FIG. 7C are inner channel major axis length $E_I$, inner channel minor axis length $F_1$, barrier channel major axis length $E_B$, and barrier channel minor axis length $F_B$. In the illustrated embodiment, the major axes of inner channel 342 (i.e., defined by inner channel major axis length $E_I$) and barrier channel 346 (i.e., defined by barrier channel major axis length $E_B$) are oriented vertically (i.e., parallel to vertical vanes 350). An exemplary benefit of the orientation shown in the illustrated embodiment is to provide greater structural strength and stability as compared to horizontal orientation (i.e., parallel to horizontal vanes 352). An inner channel aspect ratio can be defined as the ratio of inner channel major axis length $E_I$ to inner channel minor axis length $F_L$ In the illustrated embodiment, the inner channel aspect ratio is about 1.25. In some embodiments, the inner channel aspect ratio can range from 1 (i.e., circular) to about 2.5. In other embodiments, the inner channel aspect ratio can be greater than 2.5. Inner channel aspect ratio will always be greater than or equal to 1, by virtue of its definition. In an embodiment where inner channel major axis length $E_I$ is oriented horizontally, then inner channel 342 can be said to have a particular aspect ratio (i.e., greater than 1) that is oriented horizontally. A barrier channel aspect ratio can be similarly defined as the ratio of barrier channel major axis length $E_B$ to barrier channel minor axis length $F_B$. In the illustrated embodiment, the barrier channel aspect ratio is about equal to the inner channel aspect ratio (i.e., about 1.25). As the inner channel aspect ratio, the barrier channel aspect ratio can range from 1 (i.e., circular) to about 2.5. In other embodiments, the inner channel aspect ratio can be greater than 2.5. In a preferred embodiment, the barrier channel major axis is oriented vertically and the barrier channel aspect ratio ranges from about 1.1-1.6. In some embodiments, the inner channel aspect ratio and the barrier channel aspect ratio can be different values from each other. For example, in a particular embodiment, inner channel 342 can be circular (i.e., the inner channel aspect ratio is 1), and barrier channel aspect ratio can be greater than 1, being oriented either horizontally or vertically. In other embodiments, major axes of inner channel 342 and/or barrier channel 346 can be oriented in a direction that is other than horizontal or vertical. In yet other embodiments, the major axes orientations and the aspect ratios of inner channels 342 and/or barrier channels 346 can vary from one hot flow assembly 340 to another throughout a particular heat exchanger 10. In yet other embodiments, the cross-sectional shapes of inner channel 342 and/or barrier channel 346 can be triangular, pentagonal, hexagonal, octagonal, or oval.

The exemplary embodiment shown and described in the present disclosure pertained to a cross-counter flow heat exchanger. All heat exchanger configurations are within the scope of the present disclosure, with non-limiting examples being cross-flow, counter-flow, parallel-flow, and combinations of these within the same assembly.

DISCUSSION OF POSSIBLE EMBODIMENTS

The following are non-exclusive descriptions of possible embodiments of the present invention.

A heat exchanger configured to transfer heat between a first fluid and a second fluid, the first fluid being fluidly isolated from the second fluid, the heat exchanger comprising a heat exchanger core, the heat exchanger core comprising: a plurality of first fluid flow assemblies, each configured to direct flow of the first fluid through the heat exchanger core, each of the first fluid flow assemblies comprising: a plurality of inner channels, each formed by an associated inner channel wall and configured to contain the first fluid; and a plurality of barrier channels, each surrounding an associated inner channel; and one or more second fluid channels, each configured to channel flow of the second fluid through the heat exchanger core; wherein: each of the plurality of barrier channels comprises: a barrier channel wall, configured to isolate the barrier channel from the second fluid; and one or more barrier channel vanes, configured to support the inner channel within the barrier channel; each of the barrier channels is configured to provide a void space between the inner channel wall and the barrier channel wall, thereby fluidly separating the first fluid from the second fluid; and each of the barrier channels is configured to receive the first fluid in the event of a breach of the inner channel wall and receive the second fluid in the event of a breach of the barrier channel wall.

The heat exchanger of the preceding paragraph can optionally include, additionally and/or alternatively, any one or more of the following features, configurations and/or additional components:

A further embodiment of the foregoing heat exchanger, further comprising: an inlet plenum, configured to receive the first fluid from a first fluid inlet, the inlet plenum comprising a plurality of plenum vanes defining the plurality of inner channels therebetween, each of the plurality of inner channels sandwiched between two barrier regions; an outlet plenum, configured to discharge the first fluid to a first fluid outlet, the outlet plenum comprising a plurality of plenum vanes defining the plurality of inner channels therebetween, each of the plurality of inner channels sandwiched between two barrier regions; an inlet transition region, disposed between the inlet plenum and the heat exchanger core, the inlet transition region configured to change an orientation of each of each of the plurality of barrier regions from sandwiching to coaxial with respect to the associated barrier region; and an outlet transition region, disposed between the heat exchanger core and the outlet plenum, the outlet transition region configured to change an orientation of each of each of the plurality of barrier regions from sandwiching to coaxial with respect to the associated barrier region.

A further embodiment of the foregoing heat exchanger, wherein: the first fluid inlet defines a first fluid inlet flow axis; each of the plurality of inlet channels defines a core flow axis; the inlet plenum changes a direction of the first fluid flow from the first fluid inlet flow axis to the core flow axis by an angle that ranges from 0-120 degrees; the first fluid outlet defines a first fluid outlet flow axis; and the outlet plenum changes the direction of the first fluid flow from the core flow axis to the first fluid outlet flow axis by an angle that ranges from 0-120 degrees.

A further embodiment of the foregoing heat exchanger, wherein: the inlet plenum changes the direction of the first fluid flow from the first fluid inlet flow axis to the core flow axis by an angle that is about 90 degrees; and the outlet plenum changes the direction of the first fluid flow from the core flow axis to the first fluid outlet flow axis by an angle that is about 90 degrees.

A further embodiment of the foregoing heat exchanger, wherein: each of the one or more second fluid channels defines a second fluid channel height; and the second fluid channel height ranges from 0.05-0.5 inch (1.3-13 mm).

A further embodiment of the foregoing heat exchanger, wherein: two horizontally-adjacent first fluid flow assemblies define a horizontal spacing; the horizontal spacing ranges from 0.1-1 inch (2.5-25 mm); two vertically-adjacent first fluid flow assemblies define a vertical spacing; and the vertical spacing ranges from 0.1-1 inch (2.5-25 mm).

A further embodiment of the foregoing heat exchanger, wherein: each of the plurality of inner channels comprises a circular cross-sectional shape; each of the plurality of barrier channels comprises a circular cross-sectional shape; each of the plurality of inner channels defines an inner channel diameter; the inner channel diameter ranges from 0.05-0.5 inch (1.3-13 mm); each of the plurality of barrier channels defines a barrier channel diameter; and the barrier channel diameter ranges from 0.1-1 inch (2.5-25 mm).

A further embodiment of the foregoing heat exchanger, further comprising: a plurality of horizontal vanes, horizontally supporting each of the plurality of first fluid flow assemblies; and a plurality of vertical vanes, vertically supporting each of the plurality of first fluid flow assemblies; wherein: each of the plurality of horizontal vanes defines a horizontal vane thickness; the horizontal vane thickness ranges from 0.008-0.02 inch (0.2-0.5 mm); each of the plurality of vertical vanes defines a vertical vane thickness; and the vertical vane thickness ranges from 0.008-0.02 inch (0.2-0.5 mm).

A further embodiment of the foregoing heat exchanger, wherein: each of the plurality of first fluid flow assemblies comprises four or more barrier channel vanes; each of the four or more barrier channel vanes in each of the plurality of first fluid flow assemblies defines a barrier channel vane thickness; and the horizontal vane thickness ranges from 0.008-0.02 inch (0.2-0.5 mm).

A further embodiment of the foregoing heat exchanger, wherein each of the plurality of barrier channels comprises a cross-sectional shape that is selected from the group consisting of square, diamond, triangular, pentagonal, hexagonal, octagonal, and oval.

A further embodiment of the foregoing heat exchanger, wherein the heat exchanger core comprises one or more nickel, aluminum, titanium, copper, iron, cobalt, and alloys thereof.

A further embodiment of the foregoing heat exchanger, wherein the heat exchanger core comprises a metal that is selected from the group consisting of Inconel 625, Inconel 718, Haynes 282, and AlSi10Mg.

A further embodiment of the foregoing heat exchanger, wherein: each of the plurality of barrier channels comprises an elliptical cross-sectional shape, defining a major axis and a minor axis; the major axis defines a major axis length; the minor axis defines a minor axis length; and a ratio of the major axis length to the minor axis length ranges from 1 to 2.5.

A further embodiment of the foregoing heat exchanger, wherein: the major axis is oriented vertically; and the ratio of the major axis length to the minor axis length ranges from 1.1-1.6.

A further embodiment of the foregoing heat exchanger, wherein: the inlet transition region defines a vertical transition angle; the vertical transition angle ranges from 4-40 degrees; the inlet transition region defines a barrier channel transition angle; and the barrier channel transition angle ranges from 2-45 degrees.

A further embodiment of the foregoing heat exchanger, wherein: the outlet transition region defines a vertical transition angle; the vertical transition angle ranges from 4-40 degrees; the outlet transition region defines a barrier channel transition angle; and the barrier channel transition angle ranges from 2-45 degrees.

A further embodiment of the foregoing heat exchanger, wherein: the vertical transition angle ranges from 12-18 degrees; and the barrier channel transition angle ranges from 12-18 degrees.

A further embodiment of the foregoing heat exchanger, further comprising a plurality of leakage passages, each of the plurality of leakage passages disposed on an associated plenum vane, thereby fluidly connecting two or more barrier passages.

A further embodiment of the foregoing heat exchanger, further comprising a tell-tale drain, the tell-tale drain disposed on an outer wall of a barrier channel on the inlet or outlet plenum, configured to provide a discharge path for a fluid in the associated barrier channel in the event of the breach of one or more of the inner channel walls and/or one or more of the barrier channel walls.

A further embodiment of the foregoing heat exchanger, further comprising a leakage detector, the leakage detector configured to provide an indication of the fluid discharging from the tell-tale drain.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger configured to transfer heat between a first fluid and a second fluid, the first fluid being fluidly isolated from the second fluid, the heat exchanger comprising:
a heat exchanger core comprising:
a plurality of first fluid flow assemblies, each configured to direct flow of the first fluid through the heat exchanger core, each of the first fluid flow assemblies comprising:
a plurality of inner channels, each formed by an associated inner channel wall and configured to contain the first fluid; and
a plurality of barrier channels, each surrounding an associated inner channel; and
one or more second fluid channels, each configured to channel flow of the second fluid through the heat exchanger core;
wherein:
each of the plurality of barrier channels comprises:
a barrier channel wall, configured to isolate the barrier channel from the second fluid; and
one or more barrier channel vanes, configured to support the inner channel within the barrier channel;
each of the barrier channels is configured to provide a void space between the inner channel wall and the barrier channel wall, thereby fluidly separating the first fluid from the second fluid; and
each of the barrier channels is configured to receive the first fluid in the event of a breach of the inner channel wall and receive the second fluid in the event of a breach of the barrier channel wall;
an inlet plenum configured to receive the first fluid from a first fluid inlet, the inlet plenum comprising a plurality of plenum vanes defining the plurality of inner channels therebetween, each of the plurality of inner channels sandwiched between two barrier channels;
an outlet plenum configured to discharge the first fluid to a first fluid outlet, the outlet plenum comprising a plurality of plenum vanes defining the plurality of inner channels therebetween, each of the plurality of inner channels sandwiched between two barrier channels;
an inlet transition region, disposed between the inlet plenum and the heat exchanger core, the inlet transition region configured to change an orientation of each of the plurality of inner channels and respective barrier channels of the plurality of barrier channels from a sandwiching configuration to a coaxial configuration; and
an outlet transition region, disposed between the heat exchanger core and the outlet plenum, the outlet transition region configured to change an orientation of each of the plurality of inner channels and respective barrier channels of the plurality of barrier channels from a coaxial configuration to a sandwiching configuration.

2. The heat exchanger of claim 1, wherein:
the first fluid inlet defines a first fluid inlet flow axis;
each of the plurality of inlet channels defines a core flow axis;
the inlet plenum changes a direction of the first fluid flow from the first fluid inlet flow axis to the core flow axis by an angle that ranges from 0-120 degrees;
the first fluid outlet defines a first fluid outlet flow axis; and
the outlet plenum changes the direction of the first fluid flow from the core flow axis to the first fluid outlet flow axis by an angle that ranges from 0-120 degrees.

3. The heat exchanger of claim 2, wherein:
the inlet plenum changes the direction of the first fluid flow from the first fluid inlet flow axis to the core flow axis by an angle that is 90 degrees; and
the outlet plenum changes the direction of the first fluid flow from the core flow axis to the first fluid outlet flow axis by an angle that is 90 degrees.

4. The heat exchanger of claim 1, wherein:
each of the one or more second fluid channels defines a second fluid channel height; and
the second fluid channel height ranges from 0.05-0.5 inch (1.3-13 mm).

5. The heat exchanger of claim 1, wherein:
two horizontally-adjacent first fluid flow assemblies define a horizontal spacing;
the horizontal spacing ranges from 0.1-1 inch (2.5-25 mm);
two vertically-adjacent first fluid flow assemblies define a vertical spacing; and
the vertical spacing ranges from 0.1-1 inch (2.5-25 mm).

6. The heat exchanger of claim 1, wherein:
each of the plurality of inner channels comprises a circular cross-sectional shape;
each of the plurality of barrier channels comprises a circular cross-sectional shape;
each of the plurality of inner channels defines an inner channel diameter;
the inner channel diameter ranges from 0.05-0.5 inch (1.3-13 mm);
each of the plurality of barrier channels defines a barrier channel diameter; and
the barrier channel diameter ranges from 0.1-1 inch (2.5-25 mm).

7. The heat exchanger of claim 1, further comprising:
a plurality of horizontal vanes, horizontally supporting each of the plurality of first fluid flow assemblies; and
a plurality of vertical vanes, vertically supporting each of the plurality of first fluid flow assemblies;
wherein:
each of the plurality of horizontal vanes defines a horizontal vane thickness;
the horizontal vane thickness ranges from 0.008-0.02 inch (0.2-0.5 mm);
each of the plurality of vertical vanes defines a vertical vane thickness; and
the vertical vane thickness ranges from 0.008-0.02 inch (0.2-0.5 mm).

8. The heat exchanger of claim 1, wherein:
each of the plurality of first fluid flow assemblies comprises four or more barrier channel vanes;
each of the four or more barrier channel vanes in each of the plurality of first fluid flow assemblies defines a barrier channel vane thickness; and
the barrier channel vane thickness ranges from 0.008-0.02 inch (0.2-0.5 mm).

9. The heat exchanger of claim 1, wherein each of the plurality of barrier channels comprises a cross-sectional shape that is selected from the group consisting of square, diamond, triangular, pentagonal, hexagonal, octagonal, and oval.

10. The heat exchanger of claim 1, wherein the heat exchanger core comprises one or more nickel, aluminum, titanium, copper, iron, cobalt, and alloys thereof.

11. The heat exchanger of claim 1, wherein:
each of the plurality of barrier channels comprises an elliptical cross-sectional shape, defining a major axis and a minor axis;
the major axis defines a major axis length;
the minor axis defines a minor axis length; and
a ratio of the major axis length to the minor axis length ranges from 1 to 2.5.

12. The heat exchanger of claim 11, wherein:
the major axis is oriented vertically; and
the ratio of the major axis length to the minor axis length ranges from 1.1-1.6.

13. The heat exchanger of claim 1, wherein:
the inlet transition region defines a vertical transition angle;
the vertical transition angle ranges from 4-40 degrees;
the inlet transition region defines a barrier channel transition angle; and
the barrier channel transition angle ranges from 2-45 degrees.

14. The heat exchanger of claim 1, wherein:
the outlet transition region defines a vertical transition angle;
the vertical transition angle ranges from 4-40 degrees;
the outlet transition region defines a barrier channel transition angle; and
the barrier channel transition angle ranges from 2-45 degrees.

15. The heat exchanger of claim 13, wherein:
the vertical transition angle ranges from 12-18 degrees; and
the barrier channel transition angle ranges from 12-18 degrees.

16. The heat exchanger of claim 1, further comprising a plurality of leakage passages, each of the plurality of leakage passages disposed on an associated plenum vane, thereby fluidly connecting two or more barrier passages.

17. The heat exchanger of claim 16, further comprising a tell-tale drain, the tell-tale drain disposed on an outer wall of a barrier channel on the inlet or outlet plenum, configured to provide a discharge path for a fluid in the associated barrier channel in the event of the breach of one or more of the inner channel walls and/or one or more of the barrier channel walls.

18. The heat exchanger of claim 17, further comprising a leakage detector, the leakage detector configured to provide an indication of the fluid discharging from the tell-tale drain.

19. A heat exchanger configured to transfer heat between a first fluid and a second fluid, the first fluid being fluidly isolated from the second fluid, the heat exchanger comprising a heat exchanger core, the heat exchanger core comprising:
a plurality of first fluid flow assemblies, each configured to direct flow of the first fluid through the heat exchanger core, each of the first fluid flow assemblies comprising:
a plurality of inner channels, each formed by an associated inner channel wall and configured to contain the first fluid; and
a plurality of barrier channels, each surrounding an associated inner channel; and
one or more second fluid channels, each configured to channel flow of the second fluid through the heat exchanger core;
wherein:
each of the plurality of barrier channels comprises:
a barrier channel wall, configured to isolate the barrier channel from the second fluid; and
one or more barrier channel vanes, configured to support the inner channel within the barrier channel;
each of the barrier channels is configured to provide a void space between the inner channel wall and the barrier channel wall, thereby fluidly separating the first fluid from the second fluid; and
each of the barrier channels is configured to receive the first fluid in the event of a breach of the inner channel wall and receive the second fluid in the event of a breach of the barrier channel wall;
a plurality of horizontal vanes, horizontally supporting each of the plurality of first fluid flow assemblies; and
a plurality of vertical vanes, vertically supporting each of the plurality of first fluid flow assemblies.

20. The heat exchanger of claim 19, wherein:
each of the plurality of horizontal vanes defines a horizontal vane thickness, the horizontal vane thickness ranges from 0.008-0.02 inch (0.2-0.5 mm); and
each of the plurality of vertical vanes defines a vertical vane thickness, the vertical vane thickness ranges from 0.008-0.02 inch (0.2-0.5 mm).

* * * * *